US007731009B2

(12) United States Patent
Aulanko et al.

(10) Patent No.: US 7,731,009 B2
(45) Date of Patent: Jun. 8, 2010

(54) ARRANGEMENT IN THE DRIVE MACHINERY OF A TRAVELATOR, METHOD FOR CHANGING THE DRIVE BELT OF THE HANDRAIL BELT OF THE HANDRAIL OF A TRAVELATOR, AND SUPPORT ELEMENT OF THE HANDRAIL BELT OF THE HANDRAIL OF A TRAVELATOR

(75) Inventors: Esko Aulanko, Kerava (FI); Jorma Mustalahti, Hyvinkää (FI); Marc Ossendorf, Bochum (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/325,892

(22) Filed: Dec. 1, 2008

(65) Prior Publication Data

US 2009/0139831 A1 Jun. 4, 2009

Related U.S. Application Data

(63) Continuation of application No. PCT/FI2007/000148, filed on May 30, 2007.

(30) Foreign Application Priority Data

May 30, 2006 (FI) .................................. 20060523

(51) Int. Cl.
*B65G 15/00* (2006.01)

(52) U.S. Cl. ........................ 198/335; 198/330; 198/336

(58) Field of Classification Search ................. 198/330, 198/335, 336, 337; 474/130
See application file for complete search history.

(56) References Cited

U.S. PATENT DOCUMENTS 2,096,583 A 10/1937 Handy
2,956,662 A 10/1960 Hansen
3,283,878 A 11/1966 Rissler
5,117,960 A 6/1992 Ahls et al.
5,634,546 A 6/1997 Ostermeier et al.
6,102,186 A * 8/2000 Pallinger et al. ............ 198/337
6,348,025 B1 * 2/2002 Schonenberger ............. 482/54
6,367,608 B1 * 4/2002 Franceschi .................. 198/335

(Continued)

FOREIGN PATENT DOCUMENTS

DE 2239982 A1 3/1974

(Continued)

OTHER PUBLICATIONS

International Search Report and Written Opinion of the International Searching Authority mailed Oct. 2, 2007, issued in PCT/FI2007/000148.

*Primary Examiner*—Douglas A Hess
(74) *Attorney, Agent, or Firm*—Venable LLP; Robert Kinberg; Ryan M. Flandro

(57) ABSTRACT

An arrangement in drive machinery of a travelator, moving walkway, escalator or similar apparatus, includes at least a drive motor, at least one handrail with a handrail belt, a support element supporting the handrail and a drive belt connecting rotational movement of the drive motor to the support element. The support element comprises a supporting wheel, having a rim and adapted for use by the drive belt which is fitted to the rim of the support element.

10 Claims, 5 Drawing Sheets

U.S. PATENT DOCUMENTS

| | | | | |
|---|---|---|---|---|
| 6,402,649 | B1 * | 6/2002 | Amkreutz | 474/130 |
| 6,450,317 | B1 | 9/2002 | Fargo et al. | |
| 6,637,579 | B2 * | 10/2003 | Pietz | 198/322 |
| 6,692,391 | B2 * | 2/2004 | Gerring et al. | 474/130 |
| 6,834,754 | B2 * | 12/2004 | Pietz | 198/330 |
| 6,991,084 | B2 * | 1/2006 | Lunardi | 198/335 |
| 7,048,663 | B2 * | 5/2006 | Riaudel | 474/130 |
| 7,335,121 | B2 * | 2/2008 | Fletcher et al. | 474/130 |
| 7,341,139 | B2 * | 3/2008 | Aulanko et al. | 198/335 |
| 7,398,869 | B2 * | 7/2008 | Novacek et al. | 198/335 |

FOREIGN PATENT DOCUMENTS

| | | | |
|---|---|---|---|
| FR | 2 855 777 | A1 | 12/2004 |
| GB | 2205803 | A | 12/1988 |
| JP | 2005-195041 | A | 7/2005 |
| WO | WO 2005/012766 | A1 | 2/2005 |
| WO | WO 2005/075332 | A2 | 8/2005 |

* cited by examiner

ARRANGEMENT IN THE DRIVE MACHINERY OF A TRAVELATOR, METHOD FOR CHANGING THE DRIVE BELT OF THE HANDRAIL BELT OF THE HANDRAIL OF A TRAVELATOR, AND SUPPORT ELEMENT OF THE HANDRAIL BELT OF THE HANDRAIL OF A TRAVELATOR

CROSS-REFERENCE TO RELATED APPLICATION

This application is a continuation application of PCT/FI2007/000148 filed May 30, 2007, designating the United States and claiming priority of Finnish Patent Application No. FI20060523, filed May 30, 2006, the disclosure of both applications being incorporated herein by reference in their entireties.

BACKGROUND OF THE INVENTION

The present invention relates to an arrangement in the drive machinery of a travelator or similar apparatus, including drive machinery having at least a drive motor; at least one handrail with a handrail belt; and a supporting element supporting the handrail. The invention further relates to a method for changing the drive belt of the handrail belt of the handrail incorporated in a travelator or similar apparatus, as well as to a support element of the handrail belt of the handrail, travelator or similar apparatus.

Travelators, moving ramps and moving walkways generally comprise at least one handrail, around which a handrail belt is fitted as a loop, which passengers can use to support themselves and which generally moves at almost the same speed as the actual panels of the steps, ramp or walkway. The handrail belt of the handrail is moved in prior art structures e.g. with the same drive machinery as the panels. The drive machinery is generally disposed at either end of the system. The handrail belt of the handrail comprises at least a support section that travels on top of the rail, on which the passenger can lean with his/her arm, a return section, which rotates out of sight in roughly the same plane as the lower edge of the rail, as well as curved bend sections at the ends of the rail between the support section and the return section. At the end of the rail the travel direction of the handrail belt changes when the bend section of the belt passes around a bend guide arranged at the end, which is done with prior art e.g. such that it consists of a plurality of support rolls, which are arranged among themselves in the form of a curve at a suitable distance from each other. One solution consisting of the support rolls described above is disclosed in U.S. Pat. No. 5,634,546.

U.S. Pat. No. 5,117,960 presents a traction mechanism of a handrail belt of a handrail of a travelator e.g. in a type of travelator as described above. In this publication, on the return section of the handrail belt is a traction mechanism, which comprises two belts pressing each other towards the handrail belt, both of which form a closed loop. Both belts are pressed against the handrail belt with a plurality of spring-loaded rolls, which are inside the closed loop of the belts. The tractive belt of the handrail belt presses the handrail belt against the inner surface of the handrail belt and the belt acting as a support presses the handrail belt against the outer surface of the handrail belt, i.e. against the surface visible to the passengers. A problem in this solution is that since there are numerous rolls, the structure is expensive and complex, and also requires a lot of servicing. Another problem is that the support belt pressing on the outer surface of the handrail belt wears the outer surface of the handrail belt that is visible to passengers, thereby shortening the service life of the handrail belt.

U.S. Pat. No. 6,450,317 presents another traction mechanism of the handrail belt of the handrail of a travelator, wherein both the palettes and the handrail belt of the handrail are moved with the same machinery. The outer surface of the handrail belt, i.e. the surface visible to passengers, is in friction contact with the drive belt rotated by the drive motor. A plurality of compression rolls, which press the handrail belt inwards towards the drive belt, further ensure the contact. A problem in this solution also is that because there are numerous compression rolls and guide rolls, the structure is expensive and complex, and also requires a lot of servicing. In addition another problem is that the drive belt pressing on the outer surface of the handrail belt wears the outer surface of the handrail belt that is visible to passengers, thereby shortening the service life of the handrail belt. The material of the handrail belt must for exactly this reason be very resistant to wear, which however increases the price.

International patent publication number WO2005/075332 also presents a solution for moving a handrail belt. In this case a belt, which the drive machinery rotates, is fitted as a loop around support rolls. The belt is fitted such that it is in contact with the inner surface of the handrail belt and thus the handrail belt moves at the same time as the belt is rotated around the support rolls.

SUMMARY OF THE INVENTION

An object of this invention is to eliminate the aforementioned drawbacks and to achieve a simple and inexpensive arrangement in the drive machinery of a travelator or similar apparatus, in which drive machinery the drive belt of the handrail belt of the handrail does not wear as quickly as in earlier solutions.

Another object is to achieve a simple, easy and inexpensive method for replacing the drive belt of a handrail belt of a handrail incorporated in a travelator or similar apparatus.

Another object is to provide a support element of a handrail belt of a handrail of the travelator or similar apparatus, which is simple, space-saving, easy to service and which drive belt is easy to replace or install.

The above and other objects are accomplished by the invention wherein there is provided an arrangement in drive machinery of a travelator, moving walkway, escalator or similar apparatus, comprising: at least a drive motor; at least one handrail with a handrail belt; a support element comprising a supporting wheel having a rim and supporting the handrail; a drive belt fitted to the rim of the supporting wheel and connecting rotational movement of the drive motor to the support element.

According to another aspect of the invention there is provided a method for replacing the drive belt of a handrail incorporated in a travelator, moving walkway, escalator or similar apparatus, the drive belt being arranged in a drive machinery of the travelator moving walkway, escalator or similar apparatus, the drive machinery comprising at least a drive motor, the handrail being supported by a support element having an axis of rotation, wherein the drive belt connects rotational movement support element, the method comprising: fitting the drive belt to the support element in connection when placing the drive belt into position; and rotating the support element around its axis of rotation until the drive belt is placed around the support element.

According to yet another aspect of the invention there is provided a support element of the handrail belt of a handrail of a travelator, moving walkway, escalator or similar apparatus, the support element comprising a supporting wheel having a rim, wherein the supporting wheel includes a coupling element for coupling and installing a drive belt of the supporting wheel onto the rim of the supporting wheel in connection with placing the drive belt into position for imparting rotational of a drive motor to the supporting wheel.

An advantage of the arrangement according to the invention is that the drive belt of the handrail belt of the handrail and the other parts incorporated in the machinery do not wear very quickly and for this reason they do not need to be replaced, and the machinery does not need servicing very often. Another advantage is that the machinery is simple, inexpensive to implement and assembly of the machinery is easy owing the small number of parts. The machinery can also be configured to be advantageously thin in the width direction of the handrail because of, among other things, the placement of the drive belt. The arrangement according to the invention is also easy to service, e.g. using the method of the invention. One advantage of the method according to the invention is that the drive belt of the handrail belt of the handrail can be quickly, easily and inexpensively installed or replaced, because the frame structure does not need to be separately disassembled in order to replace the belt. An advantage of the support element of the invention is that the drive belt of the handrail belt of the handrail can be quickly, easily and inexpensively installed or replaced, because the frame structure does not need to be separately disassembled in order to replace the belt. In addition the support element according to the invention enables a simple handrail belt machinery and thin handrail structure, because the drive belt travels on the rim of the support element.

BRIEF DESCRIPTION OF THE DRAWINGS

In the following, the invention will be described in more detail by the aid of one of its embodiments with reference to the attached drawings, wherein.

DETAILED DESCRIPTION

Figure 1:
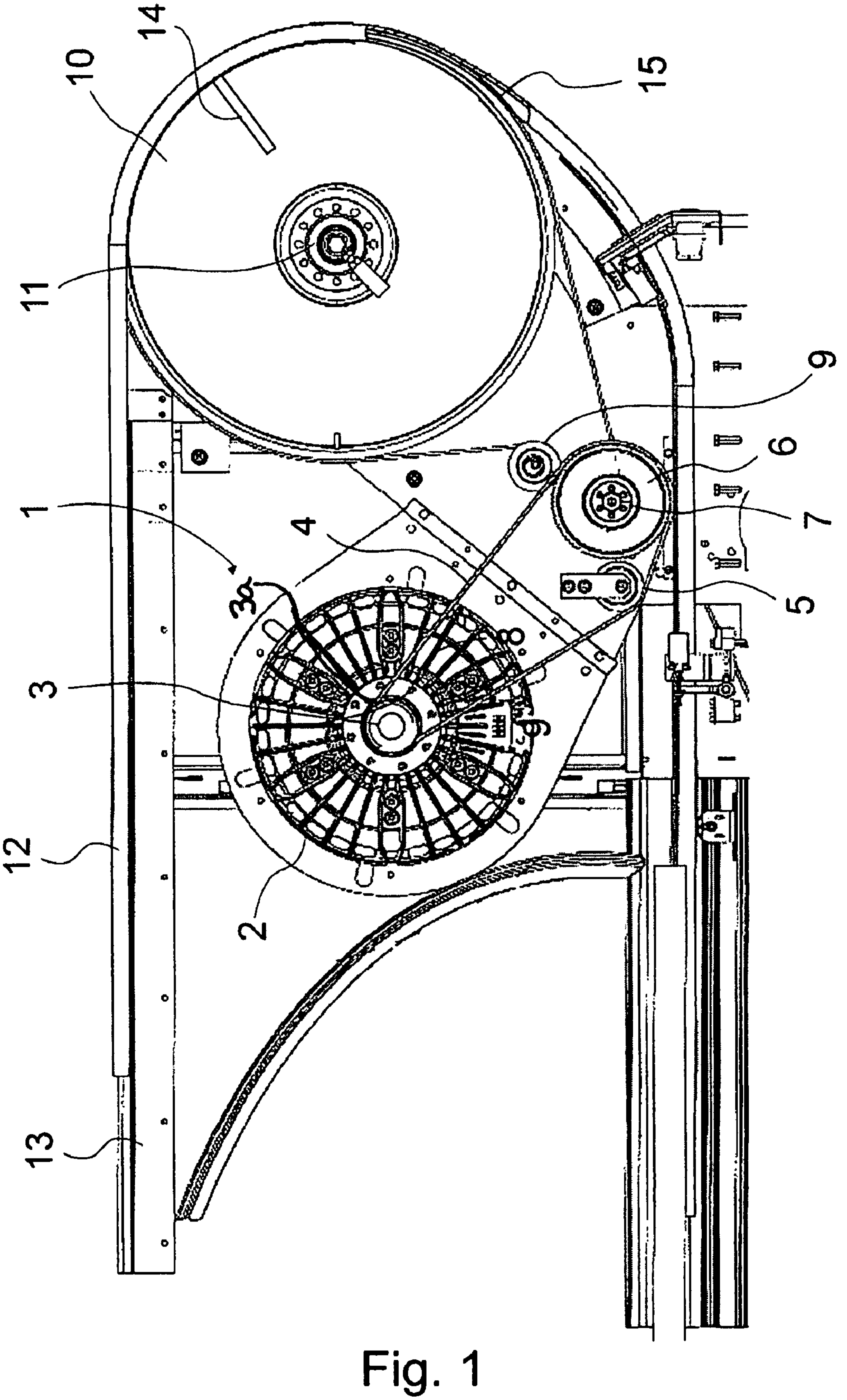
FIG. 1 presents a side view of the drive machinery of a travelator and of the handrail belt of its handrail.
Figure 2:
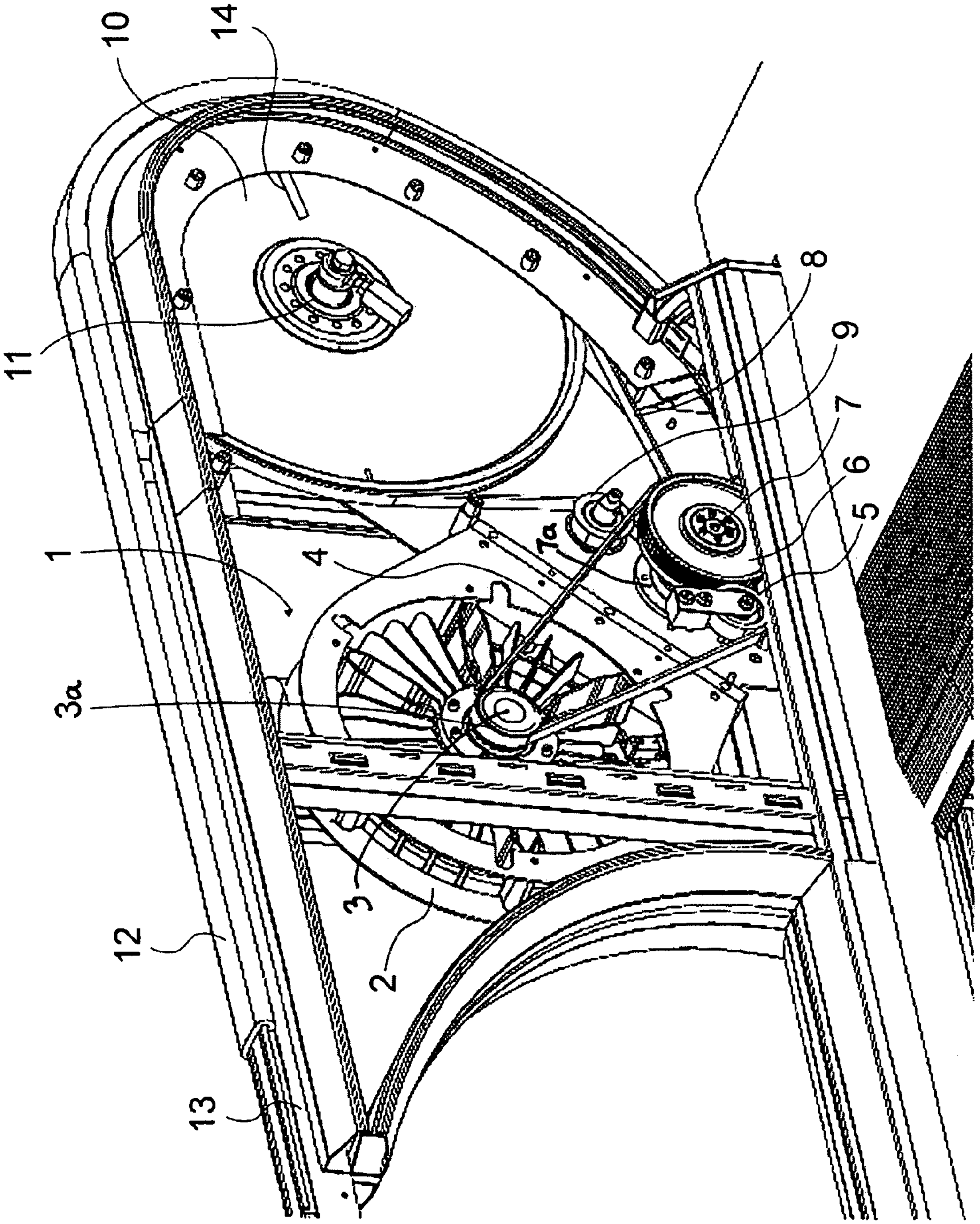
FIG. 2 presents an oblique side view of the drive machinery of a travelator and of the handrail belt of its handrail.

FIG. 1 presents a side view and FIG. 2 an oblique side view of one end of a travelator, in which the drive machinery 1 of the travelator and of the handrail belt of the handrail incorporated in it are disposed. The drive machinery comprises at least an electric motor that is provided with a centre shaft 3 and that acts as the drive motor 2. A closed belt 4 is fitted to a belt wheel **3*a* on the shaft 3, from where the belt is led to pass around a tightening wheel 5 and a transmission wheel 6 fixed to a rotating shaft 7. The belt 4 comprises a closed loop, tightened to the desired tightness, around the belt wheel 3*a* on the shaft 3 as well as around tightening wheel 5 and the transmission wheel 6. When the shaft 3 of the drive motor 2 rotates, the transmission wheel 6 also rotates via the belt 4. The transmission wheel 6 is arranged to move the panels of the travelator with a power transmission solution suited to the purpose, which is not shown in the figures. Additionally, the transmission wheel 6 is arranged to transmit driving force to the handrail belt 12 of the handrail 13, in which case the drive motor 2 at the same time moves the handrail belt 12 of the handrail. In the solution according to the invention, the drive machinery 1 of the handrail belt 12 of the handrail is essentially at the end of the handrail 13, where the direction of travel of the handrail belt 12 changes when the handrail belt 12** passes over the bend guide arranged at the end.

A drive belt 8 is also arranged to pass around the rotating shaft 7 of the transmission wheel 6, which drive belt is led from a belt wheel **7*a* on the shaft 7 around a supporting wheel 10 that is fitted to rotate on a shaft 11 and that acts as a support element of the handrail belt 12. The drive belt 8 forms a closed loop around the belt wheel 7*a* of the shaft 7 and the supporting wheel 10 such that the drive belt 8 passes below a diverting wheel 9 that tightens the drive belt 8 and changes the travel direction of the drive belt 8. By adjusting the position of the diverting wheel 9, the drive belt 8** can be tightened to the desired tightness.

The supporting wheel 10 of the handrail belt is e.g. one plate-like wheel of large diameter, the diameter of which is dimensioned such that it forms at the same time a suitable bend guide for the bend section of the handrail belt 12. Depending on the structural solution, the radius of the supporting wheel 10 is either essentially of the same magnitude as the radius of curvature of the inner surface that is the contact surface of the loop of the handrail belt 12 at least for the length of the distance of contact between the supporting wheel 10 and the handrail belt 12, or the radius of the supporting wheel 10 is at the most smaller by the thickness of the drive belt 8 than the radius of curvature of the loop of the handrail belt 12 in the contact region with the supporting wheel 10.

In the latter solution, which is described in more detail in the following, the bend section of the handrail belt 12 is arranged to pass around the supporting wheel 10 e.g. such that the inner surface that is the contact surface of the handrail belt 12 and the outer surface 15 of the drive belt 8 on the rim of the supporting wheel 10 are in friction contact with each other. When the drive motor 2 rotates the transmission wheel 6, the supporting wheel 10 also rotates via the drive belt 8. Since the drive belt 8 and the handrail belt 12 are in friction contact with each other, the handrail belt 12 also moves when the supporting wheel 10 rotates under the traction of the drive belt 8 as a result of the friction between the drive belt 8 and the handrail belt 12. The belt transmissions of the machinery 1 are fitted such that the panels of the travelator and the handrail belt 12 move at the desired speeds in relation to each other.

The belts 4 and 8 are preferably toothed belts and the belt wheels connected to the belts as well as the supporting wheel 10 are provided with toothing suited to the belts.

Figure 3:
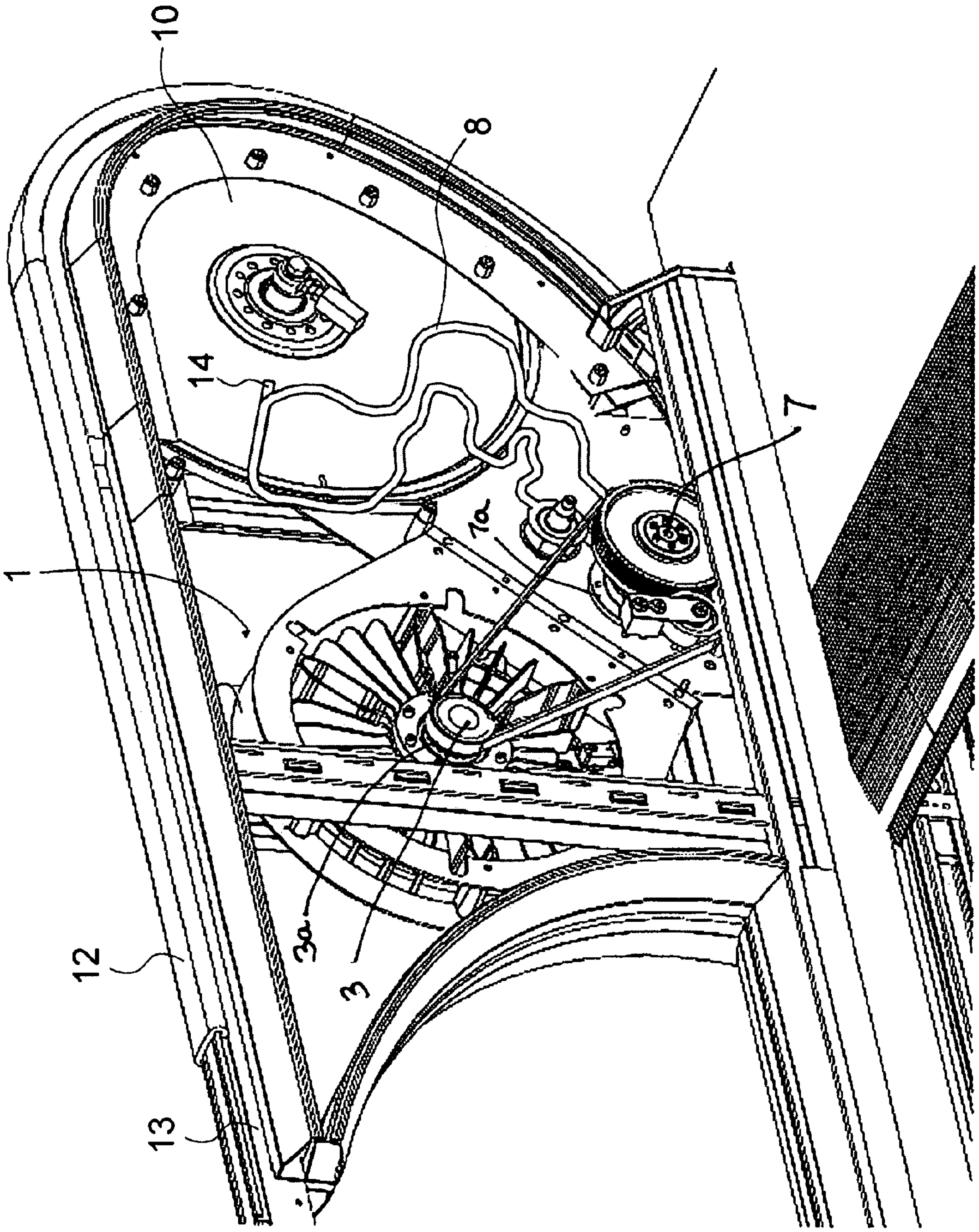
FIG. 3 presents an oblique side view of the drive machinery of a travelator and of the handrail belt of its handrail, when replacement of the drive belt has been started.

FIG. 3 presents a situation in which replacement of the drive belt 8 disposed on the shaft 7 of the transmission wheel 6 and around the supporting wheel 10 has started. The protective plating or glazing at the end of the handrail and the old drive belt have been removed and the new drive belt 8 is ready to be threaded around the supporting wheel 10. On one side of the supporting wheel 10 is an installation groove 14, acting as a coupling element, extending inwards from the rim, preferably towards the centre axis of the supporting wheel, essentially in the radial direction, onto which a part of the new belt 8 to be installed is fitted. The installation groove 14 is sufficiently deep in the axial direction of the supporting wheel 10 to keep the drive belt 8 in the groove for the duration of the replacement, but the installation groove does not need to extend in the axial direction through the entire supporting wheel. In addition, the installation groove can be suitably round-edged and a filler piece can be positioned in it, which is taken out only for the period when the drive belt is being placed into position.

Figure 4:
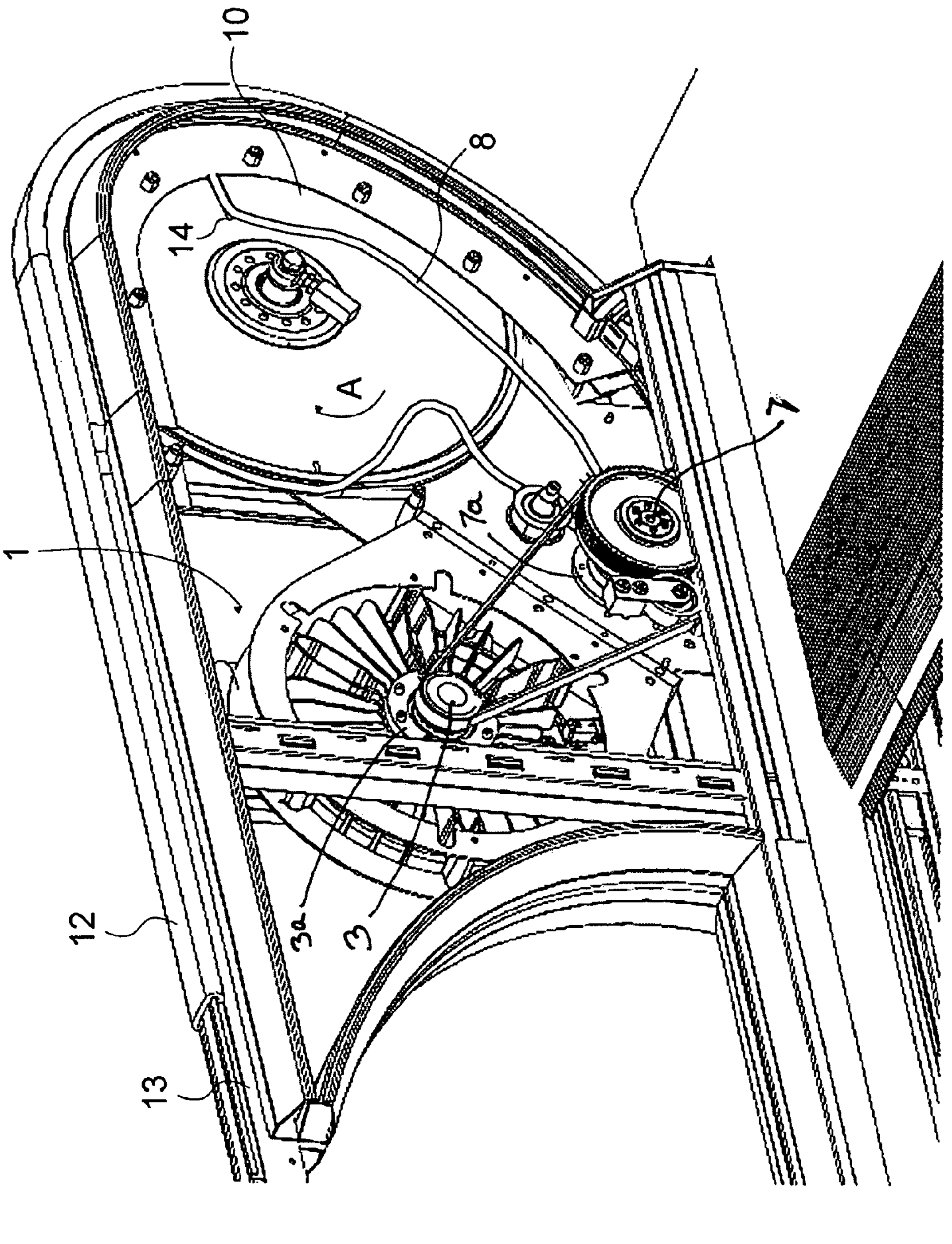
FIG. 4 presents an oblique side view of the drive machinery of a travelator and of the handrail belt of its handrail, when replacement of the drive belt has been performed to a later stage than the situation of FIG. 3.

FIG. 4 presents a situation in which installation of the new drive belt 8 has progressed further than the situation presented in FIG. 3. In this case the supporting wheel 10 has been rotated to some extent in the direction of the arrow A, and the drive belt 8 has moved along with the groove 14 between the handrail 12 and the supporting wheel 10, and at the same time the belt 8 has become positioned on the supporting wheel 10 for the distance behind the installation groove 14.

Figure 5:
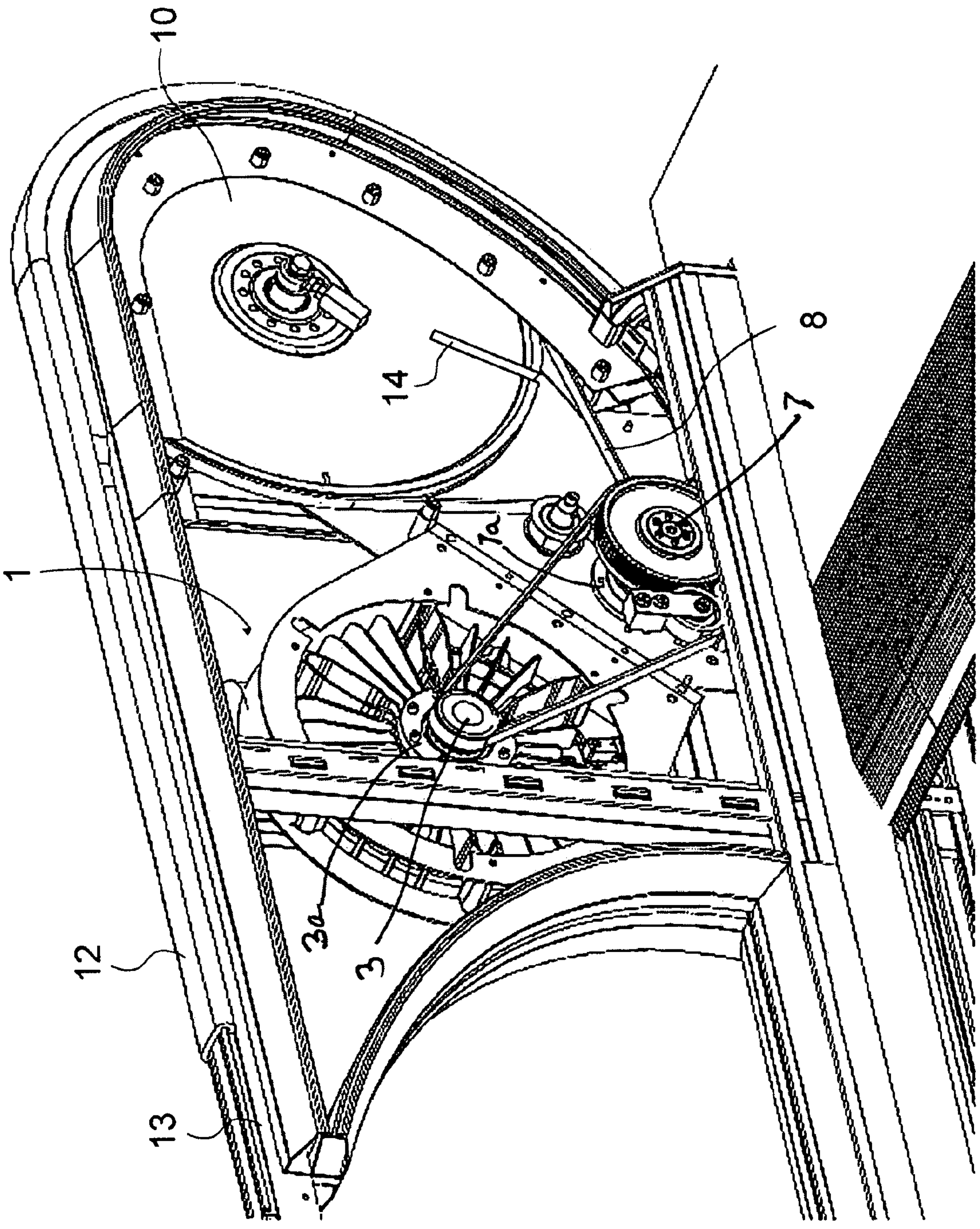
FIG. 5 presents an oblique side view of the drive machinery of a travelator and of the handrail belt of its handrail, when replacement of the drive belt has been performed to completion.

FIG. 5 presents a situation in which installation of the new drive belt 8 is completed. The supporting wheel 10 has been rotated further and the installation groove 14 has moved such that the belt 8 has slipped out of the groove. The new drive belt 8 has now passed around the supporting wheel 10 and also threaded below the diverting wheel 9 and around the belt wheel 7*a* on the shaft 7 of the transmission wheel 6.

With the method according to the invention the drive belt 8 of the handrail is replaced e.g. as follows: First any parts protecting the machinery are removed from the side on which the replacement will be made to allow access to operate the machinery. These parts can be e.g. the frame plate on the side of the machinery. After this the old drive belt 8 is removed e.g. by cutting it and pulling it out from its position. Next the supporting wheel 10 is turned into such a position that the installation groove 14 acting as a coupling element of the new drive belt 8 is in a suitable position for starting installation and the new drive belt 8 is fitted into the installation groove 14. After this the supporting wheel 10 is rotated by hand or by means of a suitable tool such that the new drive belt 8 becomes positioned on the supporting wheel 10 and finally the belt 8 drops out of the installation groove 14. After this the new drive belt 8 is threaded further around the belt wheel 7*a* on the shaft 7 of the transmission wheel 6 and also under the diverting wheel 9, and the belt 8 is tightened to the desired tightness by adjusting the position of the diverting wheel 9.

Although only the replacement of an old drive belt with a new belt is described in the embodiment above, it is of course possible with the same structures and with the same method to place the drive belt 8 into position also in other circumstances than in the replacement of the belt. Thus, for example, in connection with commissioning of the equipment, the drive belt 8 to be placed into position in the initial installation can be installed in the same manner and also e.g. in connection with a servicing or other procedure the removed belt can be replaced into position in the same way. In this case therefore there is not necessarily any need to install a new drive belt, but instead the former drive belt is usable. In general this can be called placing the drive belt 8 into position.

The support element of the handrail belt of the handrail according to the invention is marked with the reference number 10 in FIGS. 1-5. The support element is the supporting wheel 10, on the rim of which the drive belt 8 of the supporting wheel is fitted to travel. The supporting wheel 10 contains a coupling element 14 for coupling and installing the drive belt 8 of the supporting wheel 10 onto the rim of the supporting wheel 10 between the supporting wheel 10 and the handrail belt in connection with placing the drive belt 8 into position. In the figure the coupling element 14 is an installation groove, extending essentially inwards from the rim of the supporting wheel 10, to which installation groove the drive belt 8 is arranged to be fitted in connection with placing the drive belt 8 into position. The groove-like coupling element described is simple and does not essentially take space. It is possible if so desired to cover the installation groove temporarily with a filler piece. The passage of the installed drive belt 8 on the rim of the supporting wheel 10 is preferably arranged such that the drive belt 8 passes between the supporting wheel 10 and the handrail belt 12 such that its outer surface 15 is in friction contact with the inner surface of the handrail belt 12 and the inner surface touches against the supporting wheel 10. This makes the areas of contact between the supporting wheel 10 and the drive belt 8 as well as between the drive belt 8 and the handrail 12 large. With the supporting wheel 10 according to the invention, installation of the drive belt 8 can be performed with a method described elsewhere in this application. The essential fact is that the drive belt 8 to be installed is fitted into the installation groove 14, after which the supporting wheel 10 is rotated such that the new drive belt 8 is placed on the supporting wheel 10 and finally the belt 8 slips out of the installation groove 14. The structure of the support element 10 is described also elsewhere in this application.

The support element of the handrail belt according to the invention can be utilized as such with an embodiment in which the drive belt 8 is smooth or comprises toothing. Thus the drive belt 8 can be either smooth or toothed on its inner and/or outer surface. If the inner surface of the drive belt 8 is toothed, the outer surface of the supporting wheel is also toothed compatibly. According to one embodiment the outer rim of the supporting wheel can comprise a protruding edge part closely fitting the drive belt 8 on its rim at the level of the rim of the supporting wheel on at least one side of the drive belt 8 to facilitate keeping the drive belt 8 in position. The edge part can be shallower than the thickness of the drive belt, in which case the aforementioned large area of contact of the belt is not lost. According to one embodiment of the invention the edge part extends further than the drive belt 8 from the surface of the rim of the supporting wheel 10. In this case traction derived from friction can be achieved between the supporting wheel and the handrail belt 12. An advantage in this case is less wear of the drive belt.

It is obvious to the person skilled in the art that the invention is not limited solely to the examples described above, but that it may be varied within the scope of the claims presented below. Thus, for example, the new drive belt can be fixed to the supporting wheel for the purpose of installation with some other method than by fitting it to the installation groove described above. The belt can be fixed to the supporting wheel for the duration of the installation e.g. with some suitable type of fixing element.

It is further obvious to the person skilled in the art that the different phases of installing a new drive belt can be performed in some other sequence than what is described above. The new belt can e.g. be threaded right at the beginning around the shaft of the drive wheel 7*a* and below the diverting wheel and only after that it can be installed around the supporting wheel.

It is also obvious to the person skilled in the art that also just the outer rim of the supporting wheel can be in friction contact with the inner surface that is the contact surface of the handrail belt, in which case the drive belt is even deeper on the rim of the supporting wheel. In this case the handrail belt is moved by pulling it directly by the outer rim of the supporting wheel.

The invention claimed is:

1. An arrangement in drive machinery of a travelator, moving walkway, escalator or similar apparatus, comprising:

at least a drive motor;

at least one handrail with a handrail belt;

a support element comprising a supporting wheel having a rim supporting a bend section of the handrail belt;

a drive belt fitted to the rim of the supporting wheel and connecting rotational movement of the drive motor to the support element, wherein the rim of the supporting wheel has a radius that is substantially equal to or less than a radius of curvature of an inner contact surface of the handrail belt at the bend section.

2. The arrangement according to claim 1, wherein the radius of the supporting wheel rim is essentially as great as, or at most smaller by a thickness of the drive belt than, the radius of curvature of the inner contact surface at the bend section of the handrail belt.

3. The arrangement according to claim 1, wherein the drive belt is fitted to the rim of the supporting wheel such that an outer surface of the drive belt is in friction contact with the inner contact surface of the handrail belt.

4. The arrangement according to claim 1, wherein the rim of the supporting wheel is in friction contact with the inner contact surface of the handrail belt.

5. The arrangement according to claim 1, wherein the supporting wheel defines a coupling element and the drive belt is coupled to the coupling element at least when placing the drive belt into position.

6. The arrangement according to claim 5, wherein the coupling element comprises an installation groove formed in the supporting wheel and extending essentially inwards from the rim of the supporting wheel, the drive belt being fitted in the installation groove when being placed in position.

7. A method for replacing the drive belt of a handrail incorporated in a travelator, moving walkway, escalator or similar apparatus, the drive belt being arranged in a drive machinery of the travelator, moving walkway, escalator or similar apparatus, the drive machinery comprising at least a drive motor, the handrail including a handrail belt being supported by a support element having an axis of rotation, wherein the drive belt connects rotational movement of the drive motor to the support element, the method comprising:

fitting the drive belt to the support element in connection when placing the drive belt into position; and rotating the support element around its axis of rotation until the drive belt is placed around the support element.

8. The method according to claim 7, wherein the fitting step includes providing an installation groove in the support element as a coupling element for the drive belt; and fitting the drive belt to the installation groove in connection with placing the drive belt into position.

9. The method according to claim 8, wherein the providing step includes providing the support element with a rim and extending the installation groove inwardly from the rim; and the rotating step includes guiding the drive belt into position essentially around the support element with the drive belt fitted in the installation groove.

10. A support element for a handrail belt of a handrail of a travelator, moving walkway, escalator or similar apparatus, comprising: a supporting wheel having a rim, wherein the supporting wheel defines a coupling element to couple and install a drive belt of the supporting wheel onto the rim of the supporting wheel in connection with placing the drive belt into position for imparting rotational movement of a drive motor to the supporting wheel, wherein the coupling element comprises an installation groove formed in the supporting wheel and extending essentially inwards from the rim of the supporting wheel, the installation groove being adapted to receive the drive belt in connection with placing the drive belt into position around the supporting wheel.

* * * * *